United States Patent [19]

Amurri

[11] 4,077,359
[45] Mar. 7, 1978

[54] STABLE STRUCTURE FOR CATTLE SELF-FEEDING AND OPEN AIR PEN CATTLE BREEDING

[76] Inventor: Aldo Amurri, Via Mantini, 1, Chieuti (Foggia), Italy

[21] Appl. No.: 678,507

[22] Filed: Apr. 19, 1976

[51] Int. Cl.² .......................... A01K 1/00; A01K 1/10
[52] U.S. Cl. ..................................... 119/16; 119/52 R
[58] Field of Search .................. 119/16, 28, 52 R, 59, 119/58

[56] References Cited

U.S. PATENT DOCUMENTS

| 2,626,591 | 1/1953 | Mazur et al. | 119/16 |
| 2,704,051 | 3/1955 | Heiskell | 119/16 X |
| 2,843,085 | 7/1958 | McKee | 119/16 |
| 3,306,257 | 2/1967 | Conover | 119/16 |

Primary Examiner—Hugh R. Chamblee
Attorney, Agent, or Firm—Guido Modiano; Albert Josif

[57] ABSTRACT

A stable structure for cattle self-feeding and open air pen cattle breeding, comprising a plurality of modular frames each comprising two shed supporting uprights or pillars, arranged substantially V-like with their bisector axis vertical and apex downward, two side struts, each arranged laterally for supporting obliquely one respective pillar, forming with the lower portions of the pillars an inverted "W" configuration, and at least one horizontal tie rod uniting the pillars and located above the engagement points of the struts with the pillars. The modular frames are arranged spaced apart in a consecutive relationship and the pillars are connected by walls defining a central storage and gravity feed space. At the base of the pillars cattle-feeding troughs are provided for cattle feeding directly from the central space.

5 Claims, 3 Drawing Figures

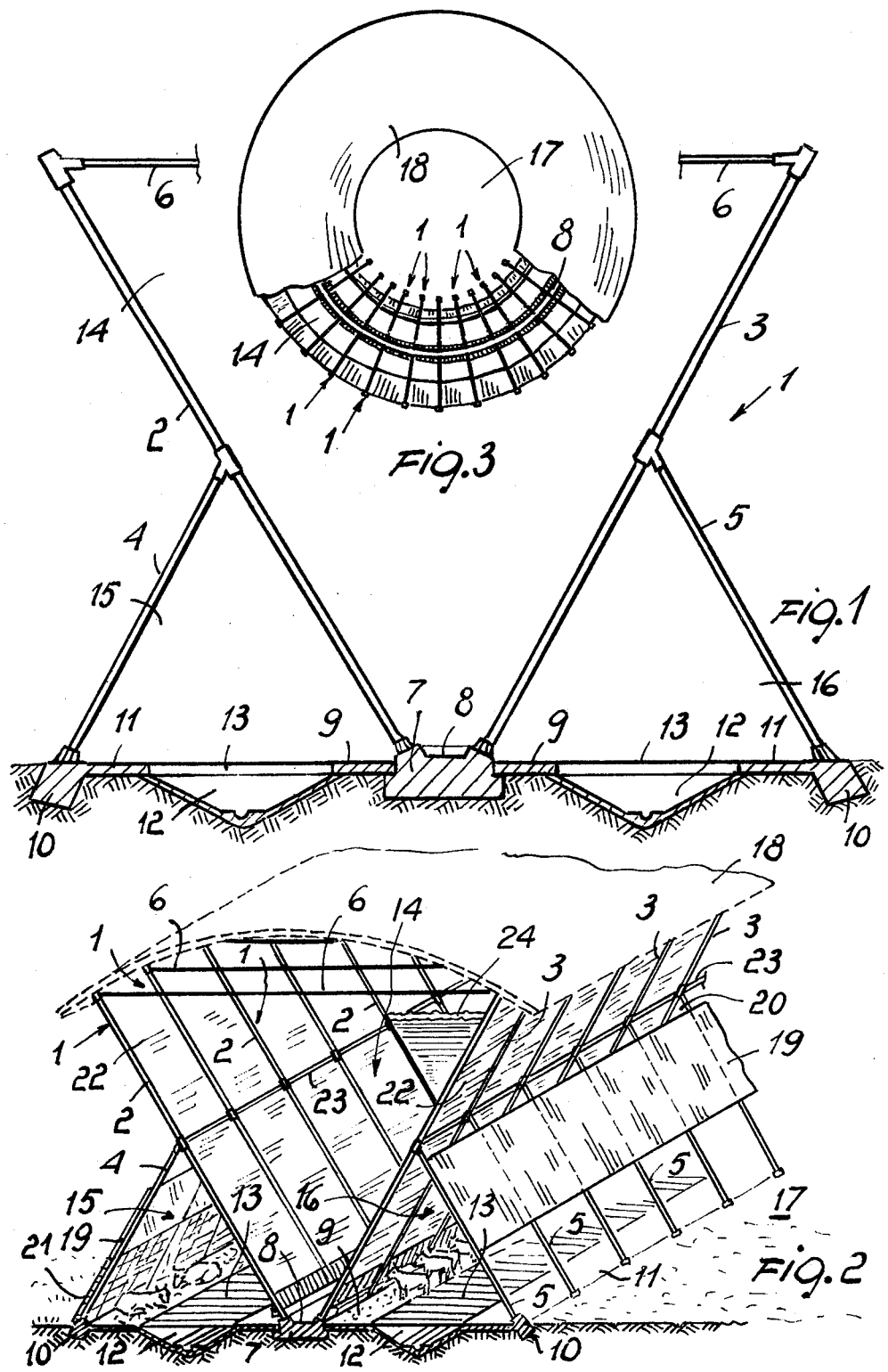

STABLE STRUCTURE FOR CATTLE SELF-FEEDING AND OPEN AIR PEN CATTLE BREEDING

BACKGROUND OF THE INVENTION

This invention relates to a stable structure, specially devised for cattle self-feeding and open air pen cattle breeding installations.

Today's animal breeding stables, and cattle breeding stables especially, both for producing meat and dairy products, differ considerably from the traditional concept of an enclosed stable with the animals on tether therein. This development has been dictated by two basic requirements: to reduce the labour force required per head of cattle, and to improve the animal hygienic conditions in order to prolong their life span, increase the production output and reduce the losses due to disease. Since such requirements are somewhat conflicting, and the experimentation is time consuming and difficult to carry out owing to the large number of environmental and economical parameters involved, various approaches have been hitherto proposed which differ from one another in that different combinations have been adopted of rest places, feeding places and milking station, if any, and different forms for the berths, and feeding, cleaning and draining systems.

Among the above approaches, some have proved successful for what concern the mechanization and automation of the cited steps. This functionality is, however, achieved at the expense of plant increased costs resulting from an excessively large area per head of cattle. Furthermore, in the totality of the prior art cases, the fodder or nurture dispensing apparatus requires sizeable and costly conveyance and dispensing means, with a path or passageway that occupies valuable sheltered space to this very aim.

Another shortcoming or problem of the prior art stables resides in the partitioning of the stable proper from enclosed storage areas or sheds for fodder and nurture: this, further to requiring additional transparent facilities, involves an increased sheltered area and, accordingly, increased plant unit cost. Although the shed and protecting roof art has made considerable progress, the cost per unit of sheltered area is still too high for the average farm management, where the invested capital has a lower turnover, and where, however, a standardization level may be achieved such as would not be thought possible in the industrial field.

SUMMARY OF THE INVENTION

It is a general object of the present invention to meet the requirements of modern zootechny by obviating the aforementioned drawbacks in the prior art.

A particular object of the invention is to reduce the cost per unit of sheltered area in a stable plant.

It is another particular object of this invention to reduce the overall sheltered area occupied per head of cattle.

A further particular object of the invention is to provide a modern stable plant which combines together, and associates both space-, function- and construction-wise the animal resting places, feeding places, fodder trough and nurture storage space.

It is yet another object of the invention to have the nurture storage space arranged above the passageway and fodder trough places without involving of necessity the erection of an elevation therefor.

These and other objects, such as will become apparent hereinafter, are achieved by a stable structure, made of a plurality of modular frames arranged spaced apart and partially connected by walls, each of the frames comprising two shed supporting uprights or pillars, arranged substantially V-like with their bisector axis vertical and apex downward, two side struts, each arranged laterally for supporting obliquely one respective pillar, forming with the lower portions of said pillars an inverted "W" configuration, and at least one horizontal tie rod uniting said pillars and located above the engagement points of said struts with said pillars, wherein the space defined by the V-like arrangement serves for the storing of fodder and nurture, while the two triangular spaces respectively defined by one pillar and one side strut form each a sheltered stable portion.

BRIEF DESCRIPTION OF THE DRAWING

The features and advantages of the invention will be better understood and appreciated from the following description of a preferred embodiment thereof, to be read in conjunction with the accompanying drawing.

The exemplary plant embodiment incorporates and illustrates devices and installations which are known per se in the modern stable. This has been done in order to show how the novel structure can facilitate the attendant activities, although it should be obviously apparent that other devices as well, either novel or conventional, may be employed without departing from the invention scope.

In the drawing:

FIG. 1 is a modular supporting frame according to this invention;

FIG. 2 is a perspective view of one stable plant portion according to one embodiment of the invention; and FIG. 3 is a top plan view of a stable plant according to another embodiment of the invention.

DESCRIPTION OF THE PREFERRED EMBODIMENTS

With reference initially to FIG. 1, a modular frame for the instant stable structure is generally identified with the reference numeral 1. This is a supporting structure extending in a vertical plane and comprised of rods (pillars and ties) forming a single and statically independent framework. Two supporting uprights or pillars, 2 and 3, are arranged in a V-like configuration, symmetrical with respect to the vertical axis and divergent to the top; two side struts, 4 and 5, are connected thereto, one on each side, externally of the V-like pillar configuration. The struts 4, 5 extend in the plane of the pillars 2, 3 inclined with respect thereto and each have an upper end engaging a corresponding pillar at an intermediate point thereof and a lower end secured to a corresponding base block 10 in a position spaced away from the vertex of the V-like pillar configuration, such that the two lower portions of the supporting pillars, up to the engagement point with the side struts, together with the latter form an inverted W configuration, or in other words, two stands aligned in one plane. The two top ends of the supporting pillars 2, 3 are united together or interconnected by a horizontal tie rod 6. The two pillars 2, 3 rest with their lower ends at the apex of the "V" on a single base or concrete block 7 secured to ground; most suitably, for reasons that will be explained hereinafter, the two lower ends of the pillars 2, 3 are appreciably spaced apart, being separated by a flat portion 8. Two concrete slabs 9 project from the block 7 toward the two triangular spaces formed, respectively, between the lower portions of the pillars 2 and 3 and the side struts 4,5. From the base blocks 11 two slabs 10 project toward the opposite slabs 9. FIG. 1 shows, moreover, in sectional view, two channels 12 covered by grille floors 13 the function whereof, as well as the functions of further parts other than structural, will be explained while discussing the stable plant whereof the instant supporting frame is a modular element recurring at regular in a consecutive relationship along the stable axial line, i.e. in a direction perpendicular to the plane of FIG. 1. As noted above, the frame 1, which may be schematically considered as a rod framework hinge-connected together, has a hyperstatic value to some degree, and must be, accordingly, an essentially elastic structure, thus, preferably, metallic; however, this should not be construed as a limitation since some parts, based upon a purely economical evaluation, may also be made of reinforced concrete or other suitable material. Now, in order to describe how the frame 1 is utilized in the construction of a stable, reference should be made to both FIG. 1 and FIG. 2. Considering FIG. 1 as a schematic cross-section of a stable plant, there are provided means for connecting the frames including walls 22 between parallel pillars thereby to define three spaces or compartments, separated and adjacent to one another, i.e. a large hopper like central space 14 laterally defined by the pillars 2, 3, and two triangular cross-section side spaces 15, 16, defined by the pillars 2 with the facing side struts 4 and, respectively, by the pillars 3 with the facing struts 5. The space 14 constitutes a sheltered storage and gravity feed space for the fodder and/or nurtures for the stable animals, the two spaces 15 and 16 constitute sheltered stable spaces proper. In the embodiment illustrated, it has been assumed that the animals accomodated are cattle, and that the layout is such that such animals have a place for feeding, on the slabs 9, one for resting, on the slabs 11, and a deambulation area 17. From the area 17, free access is provided to the space 16, and from the latter, some passages are provided across the central storage space 14, to the space 15. The fodder storage space 14 is covered by a roof 18, e.g. galvanized sheet iron or aluminum or other suitable material, supported by the pillars 2, 3, such a roof sheltering in part the underlying stables as well. The loading is performed from the top with conventional means. The struts 4, 5 carry a strip of sheltering panels 19, e.g. of a transparent plastic laminate, extending over the upper portion of the struts in order to protect the cattle from the rain, starting from approximately two meters from ground level, leaving at the top no less than a half meter of continuous window 20. At the bottom, and up to the about two-meter distance, the struts 5 are advantageously left free for access to the deambulation area 17, whereas the struts 4 support a fabricated or manually erected wall or further panels 21 closing the stable to the outside, also to prevent theft. The walls 22 of the storage space defined by the pillars 2 and, respectively, 3, are formed, optionally, by wire netting of comparatively fine mesh or by thin metal sheets, or any other suitable material. In order to unite together the various elements forming the frame 1, there are indicated in FIG. 2 stringers 23, which ave been omitted from the description of the frame 1 because their role is secondary and could be performed, for instance, by that same metal sheeting or wire netting 22, or equivalent thereof.

The size of the plant will be dictated in part by experience, while the size of the places 9 at the fodder troughs defined at the base of the converging pillars, etc., will depend in part on the local conditions to be met, such as the types of fodder and nurture anticipated, which determine the volume size of the space 14 with respect to the remaining ones, and is partly left for the designer to decide, who may choose to optimize certain parameters, such as the inclination angles and so forth, according to the maximum load expected and materials selected.

Of the attending facilities and installations wherewith every modern stable is to be equipped, the channels 12 have been mentioned, by way of example, which serve for discharging the sewage. While other facilities are unaffected by the inventive stable structure, it should be noted that the food distribution is fully conditioned and revolutioned by the novel approach according to the invention. From observing the drawing, it appears that the space 14 is configurated like a huge hopper, whereby the animals can feed directly on the storage space, through racks, by gravity like in any silo or hayloft, possibly by opening and closing doors. Obviously, however, any mechanical system may be provided for the controlled metering of the fodder or nurture to conventional troughs, by employing existing systems which will be simplified thanks to the nearby storage space. In any cases, there will be omitted any conveying and dispensing system from the storage space to the fodder trough, as otherwise required in all the prior art stables. To this end, the portion 8 between the pillars 2, 3 forms a central passageway or corridor, which is left available to the designer for the installation of feed means to the fodder troughs. The combination stable-hayloft would seem to aggravate the risks in case of fire, since a hay conflagration would also endanger the cattle; however, by contrast, this very combination makes the fire fighting intervention and fire prevention set up less expensive. In fact, all modern stables have available, for general utility, large amounts of water, whereby with respect to the separate hayloft arrangement, the cost of installation of a water type of fire extinguishing system becomes reduced. Furthermore, by providing the walls 22 of sheet metal, by preventing the entry of air, the danger of fire may be practically eliminated, simply by sealing the upper part as well. Another step toward fire preventing may consist of separating with fireproof walls like wall 24 shown in FIG. 2 the central storage space 14 transversally; conveniently, such fireproof walls will be arranged at passages provided across the space 14 for access by the cattle to the stable 15. The stable structure and plant according to the invention, when laid out along a linear axis, have all the advantages mentioned above. Moreover, and advantageously, the inventive structure facilitates a cirque arrangement for the stable, as shown in FIG. 3, where the deambulation area 17 is completely surrounded by the stable plant. In this embodiment the frames 1 define two concentric spaced stable spaces and a storage and gravity feed space 14 therebetween. The concentric stable spaces are connected by radially extending passageways. The advantages secured by a cirque stable are obvious. The stable plant according to the invention makes the latter approach easier to implement since no crossing of the outer stable ring 15 is required which posed some difficulties in the prior art stable plants to the feeding of fodder. The cirque stable facilitates any separation of the cattle with simple radial bars, into segments.

The invention lends itself to numerous variations both of a structural nature and in implementing the stable plant, all of which are encompassed by this invention in so far as they do not depart from the inventive concept explained and illustrated herein, and as claimed in the accompanying claims.

I claim:

1. A stable structure for cattle self-feeding and breeding comprising a floor structure, a number of base blocks connected to said floor structure, a plurality of modular frames arranged spaced apart in a consecutive relationship and walls between parts of said spaced frames, each of said frames comprising two pillars converging to each other in a V-like configuration, said pillars being secured to one of said base blocks at the vertex of said V-like configuration, one lateral strut at one side of each of said pillars for supporting thereof externally of said V-like configuration, said struts each extending in the plane of said pillars inclined with respect to said pillars and each having an upper end engaging a corresponding one of said pillars at an intermediate portion thereof and a lower end secured to a corresponding other of said base blocks in a position spaced away from said vertex of said V-like configuration, at least one tie rod connecting said pillars above said struts, means for connecting said frames including walls between parallel pillars, wherein said walls define a central hopper-like sheltered storage and gravity feed space and said struts define in cooperation with the facing pillar portions two lateral stable spaces, and means for cattle self-feeding arranged at the base of said converging pillars between said feed space and each of said two lateral stable spaces.

2. A stable structure as claimed in claim 1, further comprising sheltering panels secured to said consecutive struts, the panels of the struts defining one of said stable spaces extending substantially from bottom to top of said struts and the panels of the struts defining the other of said lateral stable spaces extending over the upper portion only of said struts for leaving passageways for the cattle between said other stable space and the outside of the stable.

3. A stable structure as claimed in claim 1, further comprising passageways between said lateral stable spaces across said central sheltered storage and gravity feed space.

4. A stable structure as claimed in claim 1, wherein said modular frames are arranged along a circular layout defining two concentric spaced stable spaces and an annular hopper-like storage and gravity feed space therebetween, radially extending passageways being provided between said concentric stable spaced spaces.

5. A stable structure as claimed in claim 1, further comprising firproof walls extending transversely within said central storage and gravity feed space.

* * * * *